United States Patent
Williams

(10) Patent No.: US 11,427,318 B2
(45) Date of Patent: Aug. 30, 2022

(54) DELIVERY DRONE APPARATUS

(71) Applicant: Joseph Williams, Knoxville, TN (US)

(72) Inventor: Joseph Williams, Knoxville, TN (US)

(*) Notice: Subject to any disclaimer, the term of this patent is extended or adjusted under 35 U.S.C. 154(b) by 496 days.

(21) Appl. No.: 16/551,855

(22) Filed: Aug. 27, 2019

(65) Prior Publication Data

US 2021/0061461 A1 Mar. 4, 2021

(51) Int. Cl.
*B64C 39/02* (2006.01)
*B64D 9/00* (2006.01)
*B64D 47/08* (2006.01)
*B64C 25/52* (2006.01)
*B64D 47/02* (2006.01)

(52) U.S. Cl.
CPC .......... *B64C 39/024* (2013.01); *B64C 25/52* (2013.01); *B64D 9/00* (2013.01); *B64D 47/02* (2013.01); *B64D 47/08* (2013.01); *B64C 2201/027* (2013.01); *B64C 2201/06* (2013.01); *B64C 2201/128* (2013.01); *B64C 2201/145* (2013.01); *B64C 2201/146* (2013.01); *B64C 2201/18* (2013.01)

(58) Field of Classification Search
CPC .................... B64C 2201/027; B64C 2201/128
See application file for complete search history.

(56) References Cited

U.S. PATENT DOCUMENTS

| | | | |
|---|---|---|---|
| 9,359,074 B2 * | 6/2016 | Ganesh | G05D 1/0022 |
| D760,624 S | 7/2016 | Balaresque | |
| 9,580,173 B1 * | 2/2017 | Burgess | B64D 1/22 |
| 9,619,776 B1 * | 4/2017 | Ford | G05D 1/0088 |
| 2010/0004798 A1 | 1/2010 | Bodin | |
| 2011/0017863 A1 | 1/2011 | Goossen | |
| 2013/0240673 A1 | 9/2013 | Schlosser | |
| 2016/0033966 A1 | 2/2016 | Farris | |
| 2017/0050747 A1 | 2/2017 | Wessler | |
| 2017/0132562 A1 | 5/2017 | High | |
| 2017/0247109 A1 * | 8/2017 | Buchmueller | G05D 1/00 |
| 2018/0058864 A1 | 3/2018 | Lection | |
| 2018/0072419 A1 * | 3/2018 | Burgess | B64C 39/024 |
| 2018/0208309 A1 * | 7/2018 | Wang | B64C 35/008 |
| 2019/0202558 A1 * | 7/2019 | Teetzel | B64C 27/20 |
| 2019/0233254 A1 * | 8/2019 | Shin | H01F 7/06 |
| 2019/0373173 A1 * | 12/2019 | Wang | G03B 15/006 |
| 2021/0179265 A1 * | 6/2021 | Yamato | B64D 1/22 |
| 2021/0214082 A1 * | 7/2021 | Inuma | G05D 1/101 |

* cited by examiner

*Primary Examiner* — Richard G Davis

(57) ABSTRACT

A delivery drone apparatus for automatically delivering packages includes a drone body having a body cavity. A pair of landing skids is coupled to the drone body. A battery, a CPU, and a GPS are coupled within the body cavity. A transceiver is coupled within the body cavity and is in operational communication with the battery, the CPU, and the GPS. The transceiver is configured to communicate with a smartphone. At least one camera is coupled to the drone body. The camera is in operational communication with the battery, the CPU, the GPS, and the transceiver. A plurality of motors are coupled to the drone body. Each motor has a propeller and is in operational communication with the battery and the CPU. An electromagnet is coupled to the drone body. A package magnet is selectively engageable with the electromagnet and is configured to be coupled to a package.

7 Claims, 6 Drawing Sheets

DELIVERY DRONE APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to delivery devices and more particularly pertains to a new delivery device for automatically delivering packages.

(2) Description of Related Art Including Information Disclosed Under 37 CFR 1.97 and 1.98

The prior art relates to delivery devices.

BRIEF SUMMARY OF THE INVENTION

An embodiment of the disclosure meets the needs presented above by generally comprising a drone body having a body top side, a body bottom side, and a body sidewall defining a body cavity. A pair of landing skids is coupled to the drone body. A battery is coupled within the body cavity. A CPU is coupled within the body cavity and is in operational communication with the battery. A GPS is coupled within the body cavity and is in operational communication with the CPU and the battery. A transceiver is coupled within the body cavity and is in operational communication with the battery, the CPU, and the GPS. The transceiver is configured to communicate with a smartphone. At least one camera is coupled to the drone body. The camera is in operational communication with the battery, the CPU, the GPS, and the transceiver. A plurality of motor supports is coupled to the sidewall. A plurality of motors is coupled to the plurality of motor supports. Each motor is in operational communication with the battery and the CPU, each motor having a propeller. An electromagnet is coupled to the body bottom side and is in operational communication with the battery and the CPU. A package magnet is selectively engageable with the electromagnet and is configured to be coupled to a package.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
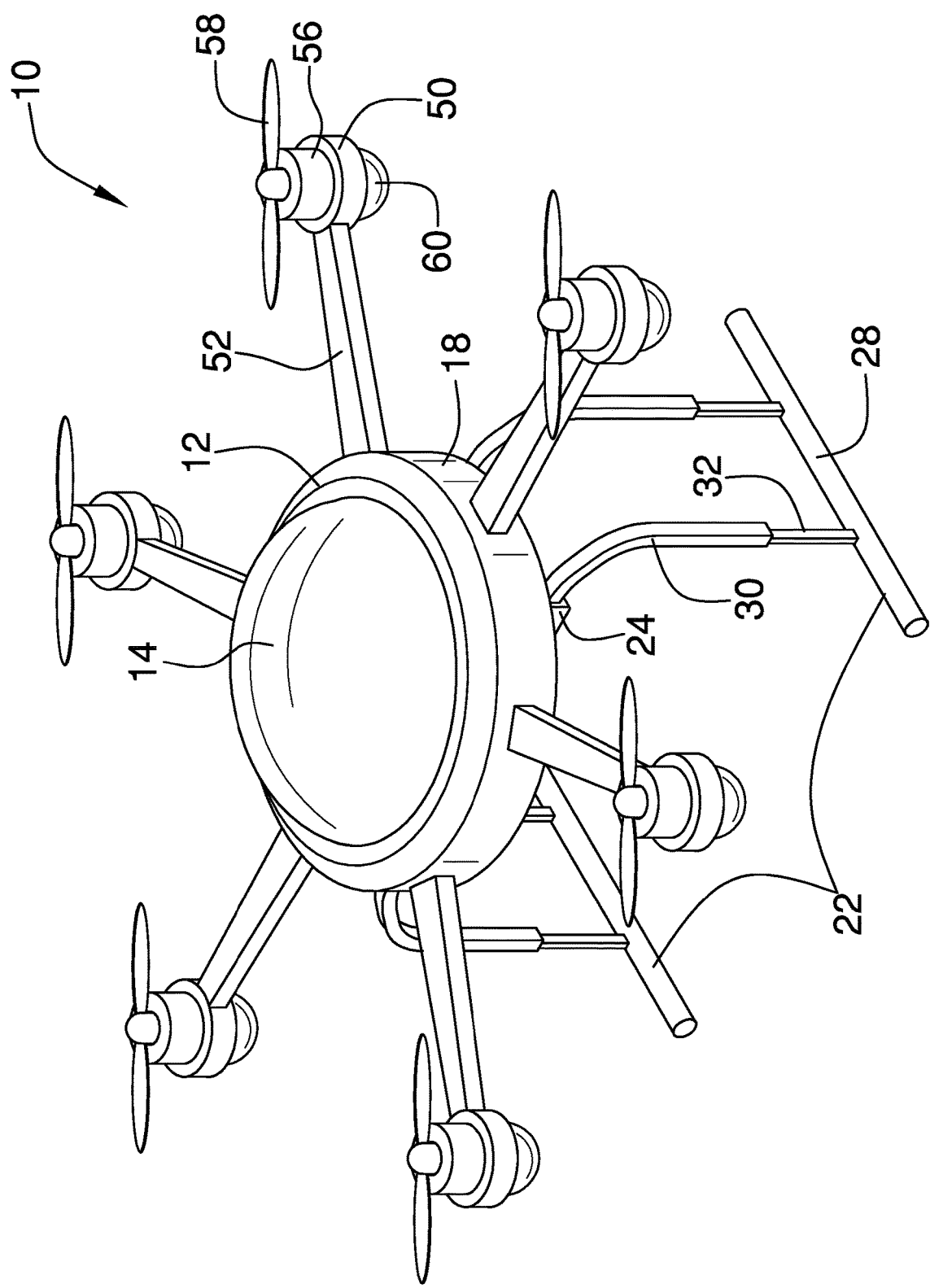
FIG. 1 is an isometric view of a delivery drone apparatus according to an embodiment of the disclosure.
Figure 2:
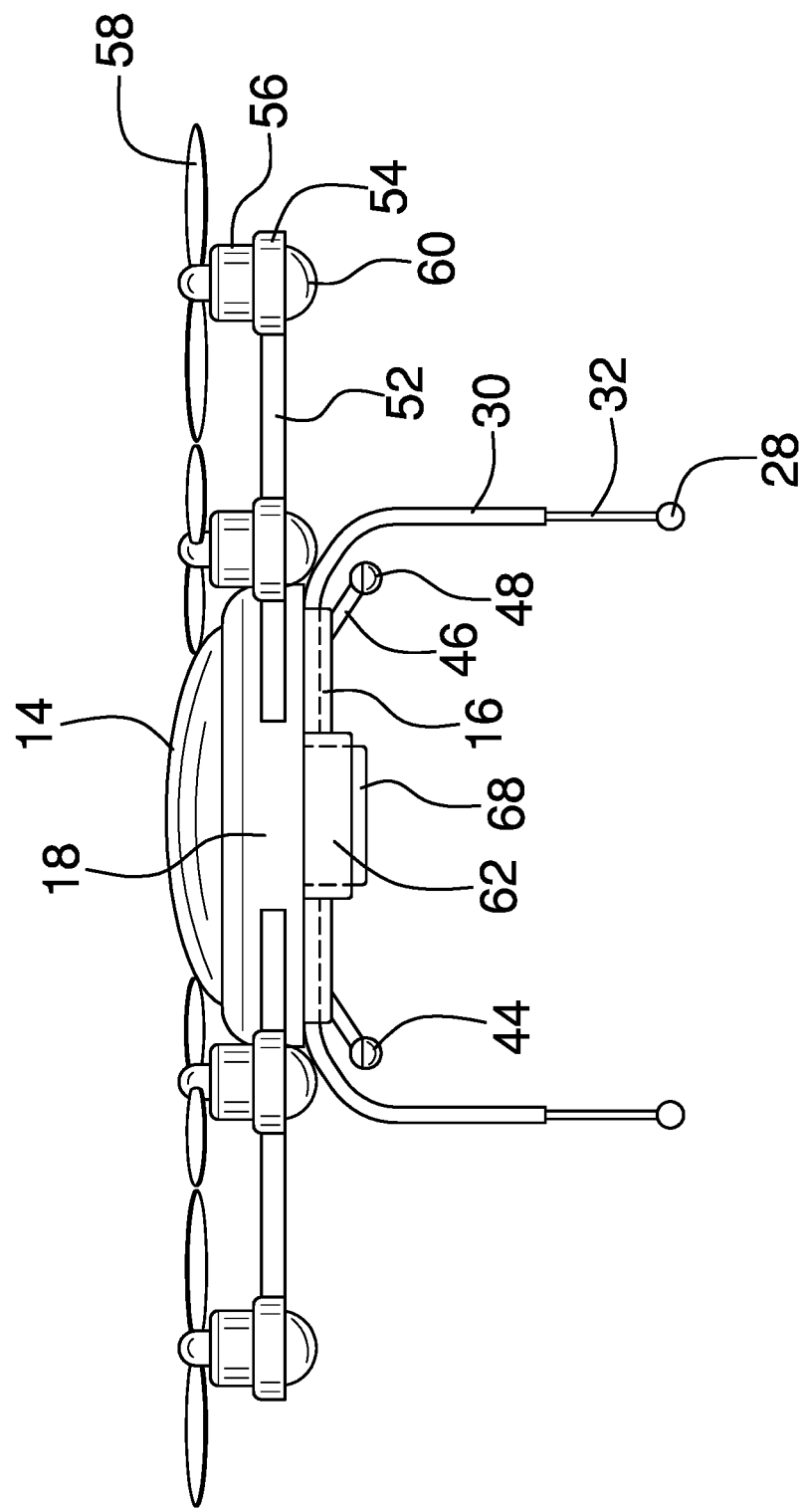
FIG. 2 is a front elevation view of an embodiment of the disclosure.
Figure 3:
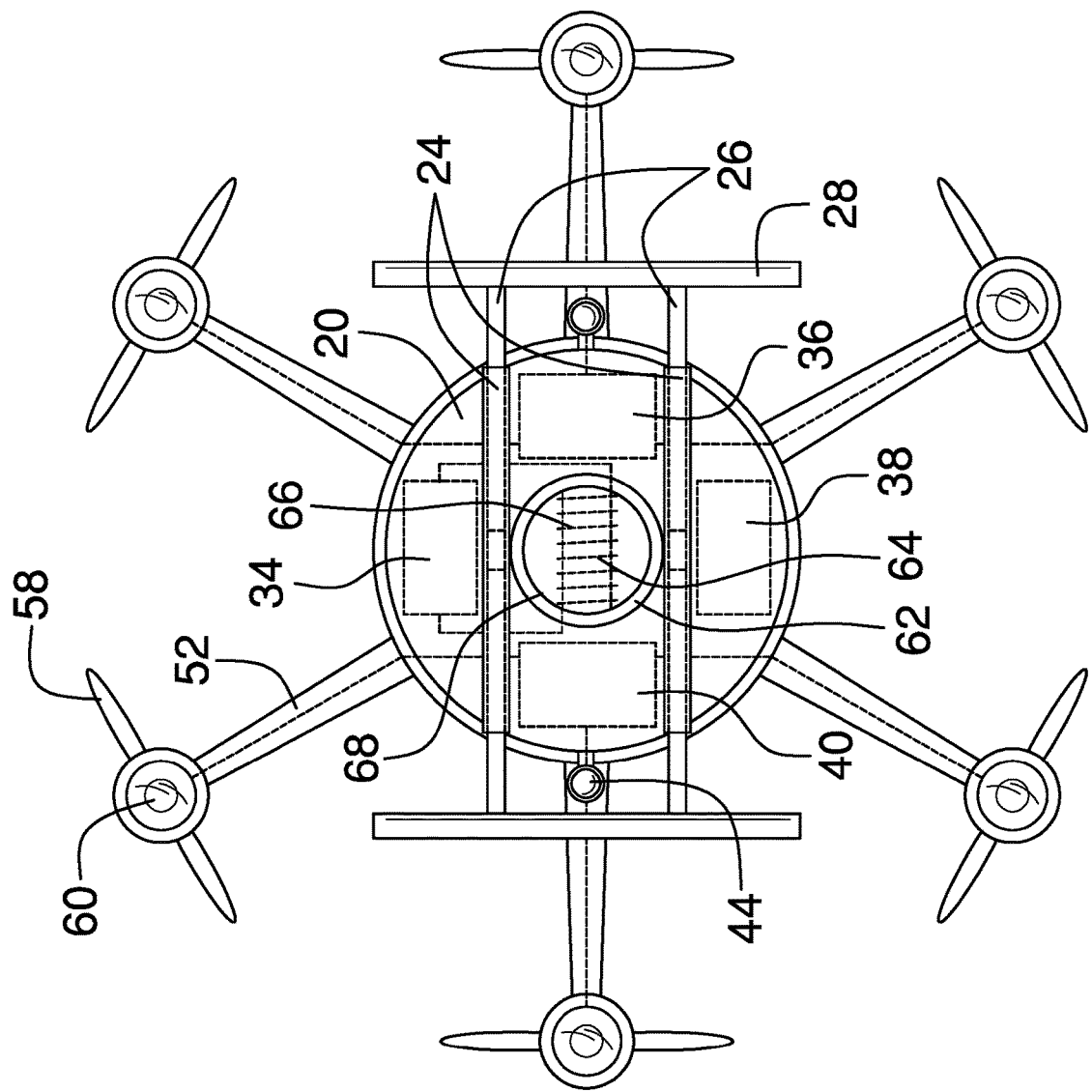
FIG. 3 is a bottom plan view of an embodiment of the disclosure.
Figure 4:
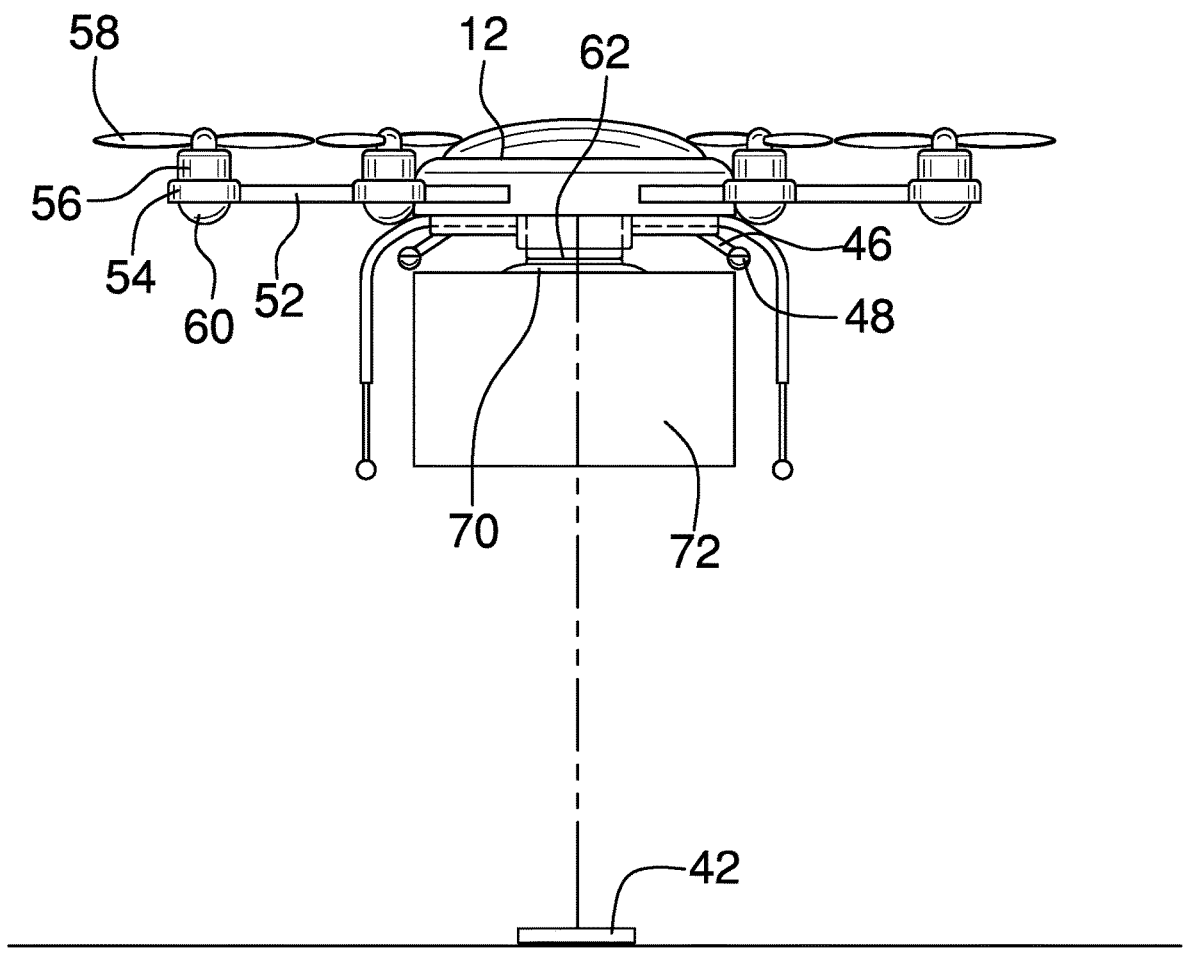
FIG. 4 is an in-use view of an embodiment of the disclosure.
Figure 5:
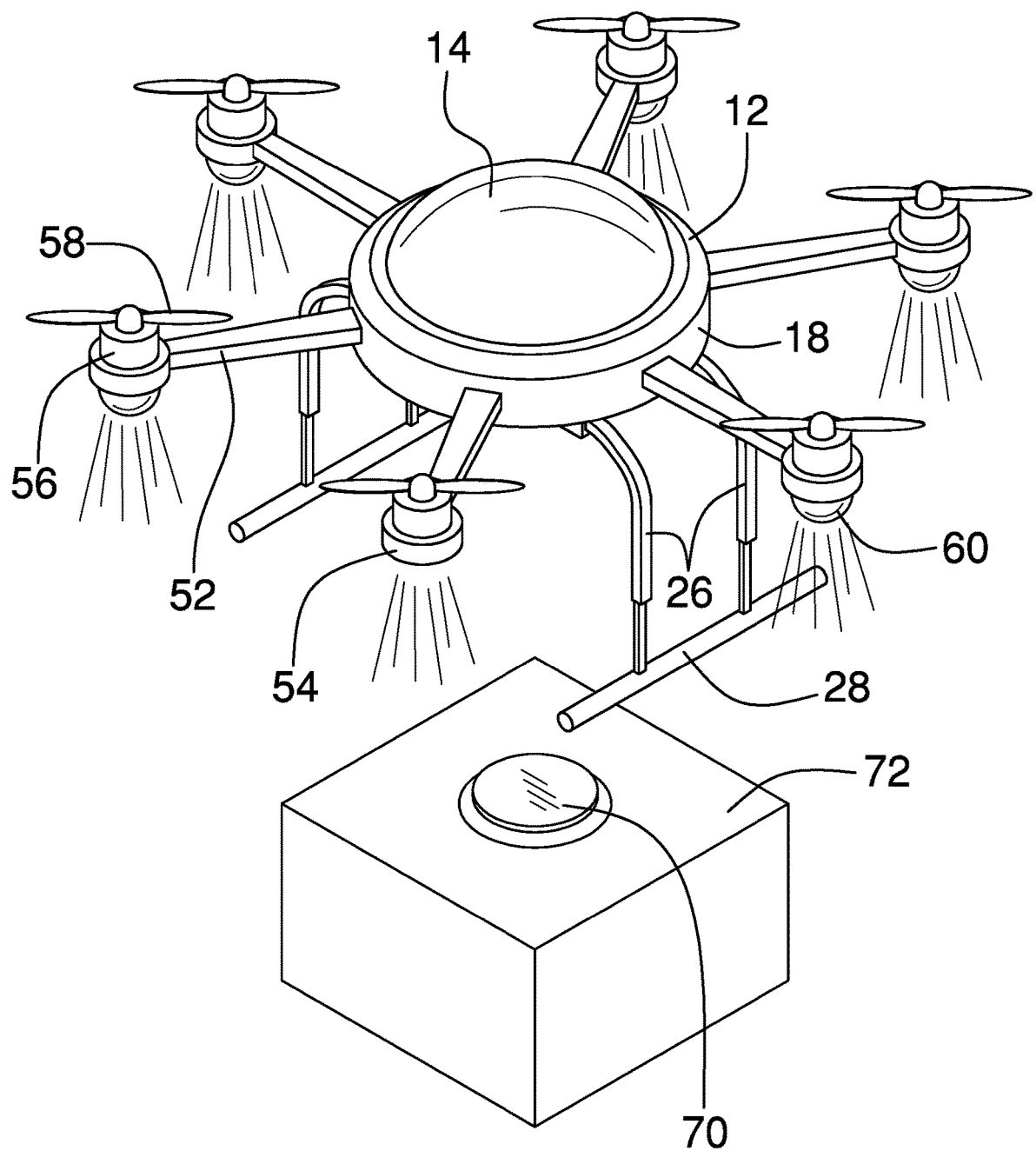
FIG. 5 is an in-use view of an embodiment of the disclosure.
Figure 6:
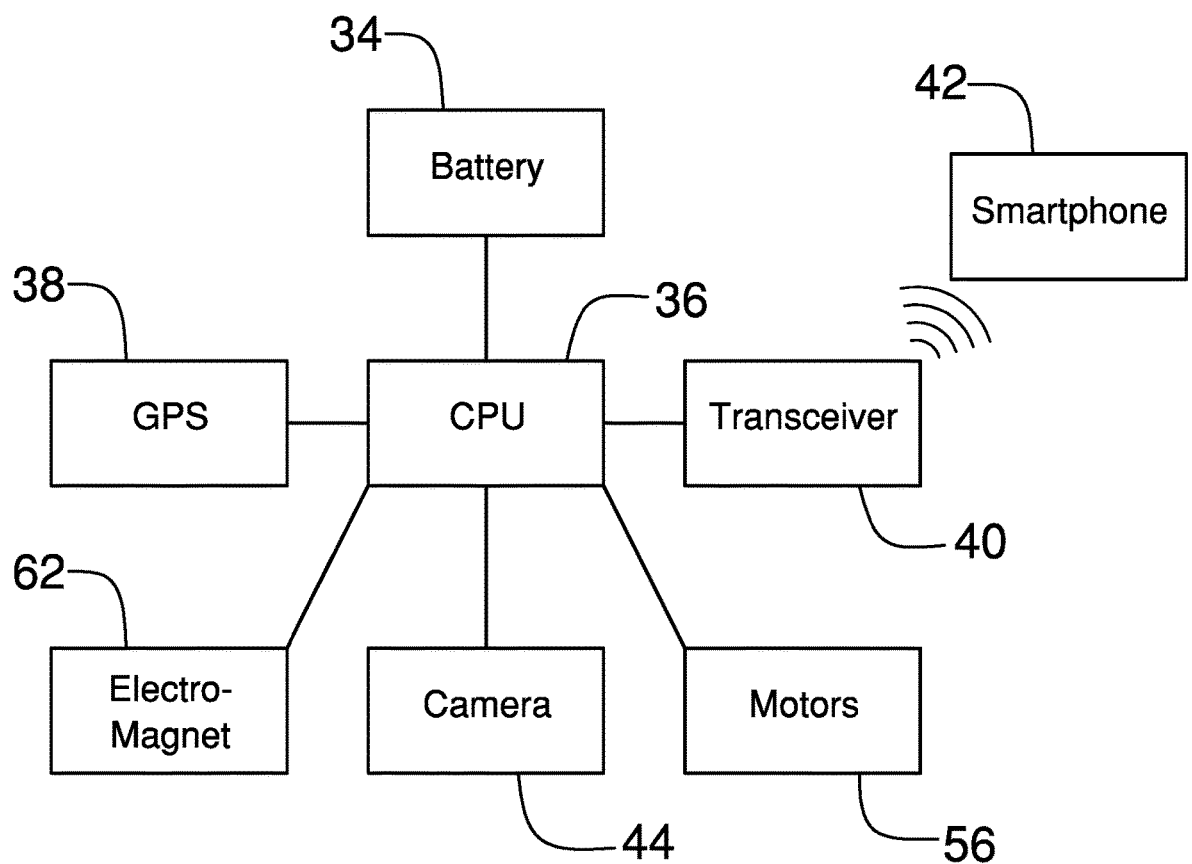
FIG. 6 is a schematic view of an embodiment of the disclosure.

With reference now to the drawings, and in particular to FIGS. 1 through 6 thereof, a new delivery device embodying the principles and concepts of an embodiment of the disclosure and generally designated by the reference numeral 10 will be described.

As best illustrated in FIGS. 1 through 6, the delivery drone apparatus 10 generally comprises a drone body 12 having a body top side 14, a body bottom side 16, and a body sidewall 18 defining a body cavity 20. The body sidewall 18 is annular and the body top side 14 is drone-shaped. A pair of landing skids 22 is coupled to the drone body 12. Each skid 22 comprises a pair of skid sleeves 24, a pair of telescopable legs 26 coupled within the pair of skid sleeves 24, and a landing bar 28 perpendicularly coupled to the pair of telescopable legs 26. Each telescopable leg 26 has a bent upper portion 30 and a straight lower portion 32.

A battery 34 is coupled within the body cavity 20. A CPU 36 is coupled within the body cavity 20 and is in operational communication with the battery 34. A GPS 38 is coupled within the body cavity 20 and is in operational communication with the CPU 36 and the battery 34. A transceiver 40 is coupled within the body cavity 20 and is in operational communication with the battery 34. The CPU 36, and the GPS 38, the transceiver 40 are configured to communicate with a smartphone 42. At least one camera 44 is coupled to the drone body 12. The camera 44 is in operational communication with the battery 34, the CPU 36, the GPS 38, and the transceiver 40. The camera 44 may be two cameras 44 each having a camera arm 46 and a spherical camera head 48.

A plurality of motor supports 50 is coupled to the drone body 12. Each motor support 50 has an extension arm 52 coupled to the body sidewall 18 and a circular motor mount 54 coupled to the extension arm 52. A plurality of motors 56 is coupled to the plurality of motor supports 50. Each motor 56 is in operational communication with the battery 34 and the CPU 36. Each motor 56 has a propeller 58. A plurality of lights 60 is coupled to an underside of each of the plurality of motor supports 50 to make the apparatus 10 more visible and to aid in nighttime deliveries. Each light 60 may be dome-shaped. An electromagnet 62 is coupled to the body bottom side 16 and is in operational communication with the battery 34 and the CPU 36. The electromagnet 62 has a coil 64, a core 66, and a circular selectively magnetic surface 68 adjacent the coil. A package magnet 70 is selectively engageable with the electromagnet 62 and is configured to be coupled to a package 72.

In use, the electromagnet 62 engages the package magnet 70 coupled to the package 72. The plurality of motors 56 powers the apparatus 10 and the GPS 38 and the transceiver 40 home in on the package recipient's smartphone 42. The apparatus 10 takes off and lands on the pair of landing skids 22, disengaging the electromagnet 62 to release the package 72.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A delivery drone apparatus comprising:
a drone body, the drone body having a body top side, a body bottom side, and a body sidewall defining a body cavity;
a pair of landing skids coupled to the drone body;
a battery coupled to the drone body, the battery being coupled within the body cavity;
a CPU coupled to the drone body, the CPU being coupled within the body cavity and being in operational communication with the battery;
a GPS coupled to the drone body, the GPS being coupled within the body cavity and being in operational communication with the CPU and the battery;
a transceiver coupled to the drone body, the transceiver being coupled within the body cavity and being in operational communication with the battery, the CPU, and the GPS, the transceiver being configured to communicate with a smartphone;
at least one camera coupled to the drone body, the camera being in operational communication with the battery, the CPU, the GPS, and the transceiver;
a plurality of motor supports coupled to the drone body, each motor support being coupled to the sidewall;
a plurality of motors coupled to the plurality of motor supports, each motor being in operational communication with the battery and the CPU, each motor having a propeller;
an electromagnet coupled to the drone body, the electromagnet being coupled to the body bottom side and being in operational communication with the battery and the CPU; and
a package magnet, the package magnet being selectively engageable with the electromagnet and being configured to be coupled to a package; and
wherein each skid comprises
a pair of skid sleeves,
a pair of telescopable legs coupled within the pair of skid sleeves such that the telescopable legs are parallel to each other, and
a landing bar perpendicularly coupled to the pair of telescopable legs, each telescopable leg having a bent upper portion and a straight lower portion.

2. The delivery drone apparatus of claim 1 further comprising a plurality of lights coupled to an underside of each of the plurality of motor supports.

3. The delivery drone apparatus of claim 2 wherein each light is dome-shaped.

4. The delivery drone apparatus of claim 1 wherein the body sidewall is annular.

5. The delivery drone apparatus of claim 1 wherein each motor support has an extension arm coupled to the body sidewall and a circular motor mount coupled to the extension arm.

6. The delivery drone apparatus of claim 1 wherein the at least one camera is two cameras each having a camera arm and a spherical camera head.

7. A delivery drone apparatus comprising:
a drone body, the drone body having a body top side, a body bottom side, and a body sidewall defining a body cavity, the body sidewall being annular and the body top side being drone-shaped;
a pair of landing skids coupled to the drone body, each skid comprising
a pair of skid sleeves,
a pair of telescopable legs coupled within the pair of skid sleeves, the telescopable legs being parallel to each other, and
a landing bar perpendicularly coupled to the pair of telescopable legs, each telescopable leg having a bent upper portion and a straight lower portion;
a battery coupled to the drone body, the battery being coupled within the body cavity;
a CPU coupled to the drone body, the CPU being coupled within the body cavity and being in operational communication with the battery;
a GPS coupled to the drone body, the GPS being coupled within the body cavity and being in operational communication with the CPU and the battery;
a transceiver coupled to the drone body, the transceiver being coupled within the body cavity and being in operational communication with the battery, the CPU, and the GPS, the transceiver being configured to communicate with a smartphone;

a camera coupled to the drone body, the camera being in operational communication with the battery, the CPU, the GPS, and the transceiver, the camera being one of two cameras each having a camera arm and a spherical camera head;
a plurality of motor supports coupled to the drone body, each motor support having an extension arm coupled to the body sidewall and a circular motor mount coupled to the extension arm;
a plurality of motors coupled to the plurality of motor supports, each motor being in operational communication with the battery and the CPU, each motor having a propeller;
a plurality of lights coupled to an underside of each of the plurality of motor supports, each light being dome-shaped;
an electromagnet coupled to the drone body, the electromagnet being coupled to the body bottom side and being in operational communication with the battery and the CPU; and
a package magnet, the package magnet being selectively engageable with the electromagnet and being configured to be coupled to a package.

* * * * *